United States Patent
Liang et al.

(10) Patent No.: US 11,223,286 B2
(45) Date of Patent: Jan. 11, 2022

(54) METHODS FOR ESTIMATING OUTPUT CURRENT OR OUTPUT VOLTAGE OF ISOLATED RESONANT CONVERTER

(71) Applicant: National Cheng Kung University, Tainan (TW)

(72) Inventors: Tsorng-Juu Liang, Tainan (TW); Chi-Hung Lin, Tainan (TW); Wei-Jing Tseng, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 0 days.

(21) Appl. No.: 16/859,219

(22) Filed: Apr. 27, 2020

(65) Prior Publication Data

US 2020/0366209 A1 Nov. 19, 2020

(30) Foreign Application Priority Data

May 15, 2019 (TW) .................................. 108116807

(51) Int. Cl.
*H02M 3/335* (2006.01)
*H02M 3/00* (2006.01)

(52) U.S. Cl.
CPC .......... *H02M 3/33569* (2013.01); *H02M 3/01* (2021.05); *H02M 3/33523* (2013.01)

(58) Field of Classification Search
CPC .................. H02M 1/0058; H02M 3/01; H02M 3/335–33592
See application file for complete search history.

(56) References Cited

U.S. PATENT DOCUMENTS

| 10,326,377 | B1 * | 6/2019 | Xiong ..................... H05B 45/14 |
| 10,483,860 | B1 * | 11/2019 | Xiao ........................ H02M 1/08 |
| 10,749,441 | B1 * | 8/2020 | Singh ................. H02M 3/33584 |
| 2017/0222560 | A1 * | 8/2017 | Babazadeh ....... H02M 3/33507 |
| 2018/0062383 | A1 * | 3/2018 | Kawashima ...... H02M 3/33523 |

OTHER PUBLICATIONS

Tsorng-Juu Liang et al. "Design and Implementation of Half-Bridge Resonant Converter With Novel Primary-Side Control" IEE Transactions on Power Electronics, vol. 35, No. 5, May 2020, pp. 5408-5416.

* cited by examiner

*Primary Examiner* — Fred E Finch, III
(74) *Attorney, Agent, or Firm* — Volpe Koenig

(57) ABSTRACT

A method for estimating an output voltage of an isolated resonant converter is disclosed. The proposed method, wherein the isolated resonant converter includes a transformer having an auxiliary winding and a secondary winding, a first output diode electrically connected to the secondary winding in series and a voltage holder coupled to the auxiliary winding, includes: obtaining the output voltage $$V_o = [v_{aux\_dh}(t) + V_F] \cdot \frac{N_s}{N_{aux}} - V_F,$$

where $v_{aux\_dh}(t)$ is an output voltage of the voltage holder, $V_F$ is a forward voltage drop of the first output diode, $N_S$ is a number of turns of the secondary winding and $N_{aux}$ is a number of turns of the auxiliary winding.

10 Claims, 14 Drawing Sheets

METHODS FOR ESTIMATING OUTPUT CURRENT OR OUTPUT VOLTAGE OF ISOLATED RESONANT CONVERTER

CROSS-REFERENCES TO RELATED APPLICATIONS

This application claims the benefits of Taiwan Patent Application Number 108116807 filed on May 15, 2019, at the Taiwan Intellectual Property Office, the disclosures of which are incorporated herein in their entirety by reference.

FIELD OF THE INVENTION

The present invention relates to a method for estimating an output current or an output voltage of an isolated resonant converter, in particular to a method for estimating an output current or an output voltage of an isolated half-bridge resonant converter, or to a method for estimating an output current or an output voltage of an isolated full-bridge resonant converter.

BACKGROUND OF THE INVENTION

In conventional isolated resonant converters, when the secondary side feedback control is used, the opto-coupler is used to feedback the secondary-side output signal. However, the characteristics of the opto-coupler are easily affected by the operating conditions and will cause higher standby power loss. For the conventional isolated resonant converters using the secondary side feedback control, usually only the voltage control method is used, and a relatively larger inductance value is chosen to decrease the time difference between the peak current at the primary side and the peak current at the secondary side. The voltage control method is also used to decrease the influence of the cross voltage of the leakage inductor of the secondary side towards the estimation of the output voltage. In addition, when the peak current at the secondary side is reached, the cross voltage of the leakage inductor of the secondary side is zero, but the forward voltage drop of the diode is not considered.

Compared to the conventional isolated resonant converters using the secondary side feedback control, when the primary side feedback control method is used, the feedback circuit comprising the opto-coupler can be omitted so as to decrease the cost and volume of the isolated resonant converters.

Based on the drawbacks of the secondary side feedback control method of the conventional isolated resonant converters mentioned above, how to propose the primary side feedback control method having the voltage control and the current control, and to make it applicable to various application situations is worthy of further research and improvement.

Keeping the drawbacks of the prior art in mind, and through the use of robust and persistent experiments and research, the applicant has finally conceived of some methods for estimating output current or output voltage of an isolated resonant converter.

SUMMARY OF THE INVENTION

It is an objective of the present invention to provide a method for estimating an output current or an output voltage of an isolated resonant converter, belonging to a primary side feedback control method, omitting the feedback circuit comprising the opto-coupler to decrease the cost and volume of the isolated resonant converters, and being applicable to various application situations.

In accordance with the first aspect of the present invention, a method for estimating an output current of an isolated resonant converter, wherein the isolated resonant converter has a switch switching period $T_S$, a transformer including a primary winding having a first and a second terminals, a resonant inductor electrically connected to the first terminal, a current sampling resistor electrically connected between the second terminal and a ground, a first and a second output terminals, an output resistor $R_O$ electrically connected to the first and the second output terminals in parallel, and an integrator electrically connected to the current sampling resistor in parallel, comprises: integrating a cross voltage of the current sampling resistor via the integrator to obtain the output current, wherein when the isolated resonant converter is operated in a series resonant converter (SRC) region, the output current $I_O = (2/T_S)|V_{int\_t0} - V_{int\_t5}|$, when the isolated resonant converter is operated in an LLC resonant converter (LLC) region, the output current $I_O = (2/T_S)(|V_{int\_t0} - V_{int\_t3}| + (1/2)t_{de}|I_{Lr\_t0} - I_{Lr\_t3}|)$, where $t_0 = 0$, $t_3$ is the time when a decoupling of the transformer is happening, $t_5 = T_S/2$, $V_{int\_t0}$ is an output voltage of the integrator at time $t_0$, $V_{int\_t3}$ is an output voltage of the integrator at time $t_3$, $V_{int\_t5}$ is an output voltage of the integrator at time $t_5$, $t_{de}$ is a time period beginning from a positive half-cycle of $T_S$ to the time when the decoupling of the transformer is happening, $I_{Lr\_t0}$ is a current flowing through the resonant inductor at time $t_0$, $I_{Lr\_t3}$ is a current flowing through the resonant inductor at time $t_3$, and $V_O I_O * R_O$, where $V_O$ is an output voltage of the isolated resonant converter.

In accordance with the second aspect of the present invention, a method for estimating an output current of an isolated resonant converter, wherein the isolated resonant converter has a switch switching period $T_S$, a transformer including a primary winding having a first and a second terminals, an exciting inductor electrically connected to the primary winding in parallel, a resonant inductor electrically connected to the first terminal, a current sampling resistor electrically connected between the second terminal and a ground, a voltage boosting circuit electrically connected between the current sampling resistor and the ground, a first and a second output terminals, an output resistor $R_O$ electrically connected to the first and the second terminals in parallel, and an integrator electrically connected to the voltage boosting circuit, comprises: boosting a cross voltage of the current sampling resistor to have an added level via the voltage boosting circuit, wherein the level $V_{LS} = (1/2)(I_{Lm\_t0} - I_{Lm\_t5})$, $I_{Lm\_t0}$ is a current flowing through the exciting inductor at time $t_0$, and $I_{Lm\_t5}$ is a current flowing through the exciting inductor at time $t_5$; and integrating the cross voltage with the added level via the integrator to obtain the output current, wherein when the isolated resonant converter is operated in an SRC region, the output current $I_O = (2/T_S)(\int_0^{t5} i_{Lr}(t)dt - (1/2)(I_{Lm\_t0} - I_{Lm\_t5}))$, where $t_0 = 0$, $t_5 = T_S/2$, $i_{Lr}(t)$ is a current flowing through the resonant inductor at time t, when the isolated resonant converter is operated in an LLC region, the output current $I_O = (2/T_S)(\int_0^{t3} i_{Lr}(t)dt - (1/2)(I_{Lr\_t0} + I_{Lr\_t3})t_{de}$, where $t_3$ is the time when a decoupling of the transformer is happening, $I_{Lr\_t0}$ is a current flowing through the resonant inductor at time $t_0$, $I_{Lr\_t3}$ is a current flowing through the resonant inductor at time $t_3$, $t_{de}$ is a time period beginning from a positive half-cycle of $T_S$ to the time when the decoupling of the transformer is happening, and $V_O = I_O * R_O$, where $V_O$ is an output voltage of the isolated resonant converter.

In accordance with the third aspect of the present invention, a method for estimating an output voltage of an isolated resonant converter, wherein the isolated resonant converter includes a transformer having an auxiliary winding and a secondary winding, a first output diode electrically connected to the secondary winding in series, a first and a second output terminals, an output resistor $R_o$ electrically connected to the first and the second output terminals in parallel, and a voltage holder coupled to the auxiliary winding, comprises: obtaining the output voltage $$V_o = [v_{aux\_dh}(t) + V_F] \cdot \frac{N_s}{N_{aux}} - V_F,$$

where $V_{aux\_dh}(t)$ is an output voltage of the voltage holder, $V_F$ is a forward voltage drop of the first output diode, $N_S$ is a number of turns of the secondary winding, $N_{aux}$ is a number of turns of the auxiliary winding, and $V_o = I_o * R_o$, wherein $V_o$ is the output voltage of the isolated resonant converter.

BRIEF DESCRIPTION OF THE DRAWINGS

Other objectives, advantages and the efficacy of the present invention will be described in detail below taken from the preferred embodiments with reference to the accompanying drawings, in which.

DETAILED DESCRIPTION OF THE PREFERRED EMBODIMENT

The present invention will now be described more specifically with reference to the following embodiments. It is to be noted that the following descriptions of the preferred embodiments of this invention are presented herein for purposes of illustration and description only; they are not intended to be exhaustive or to be limited to the precise form disclosed.

Figure 1A:
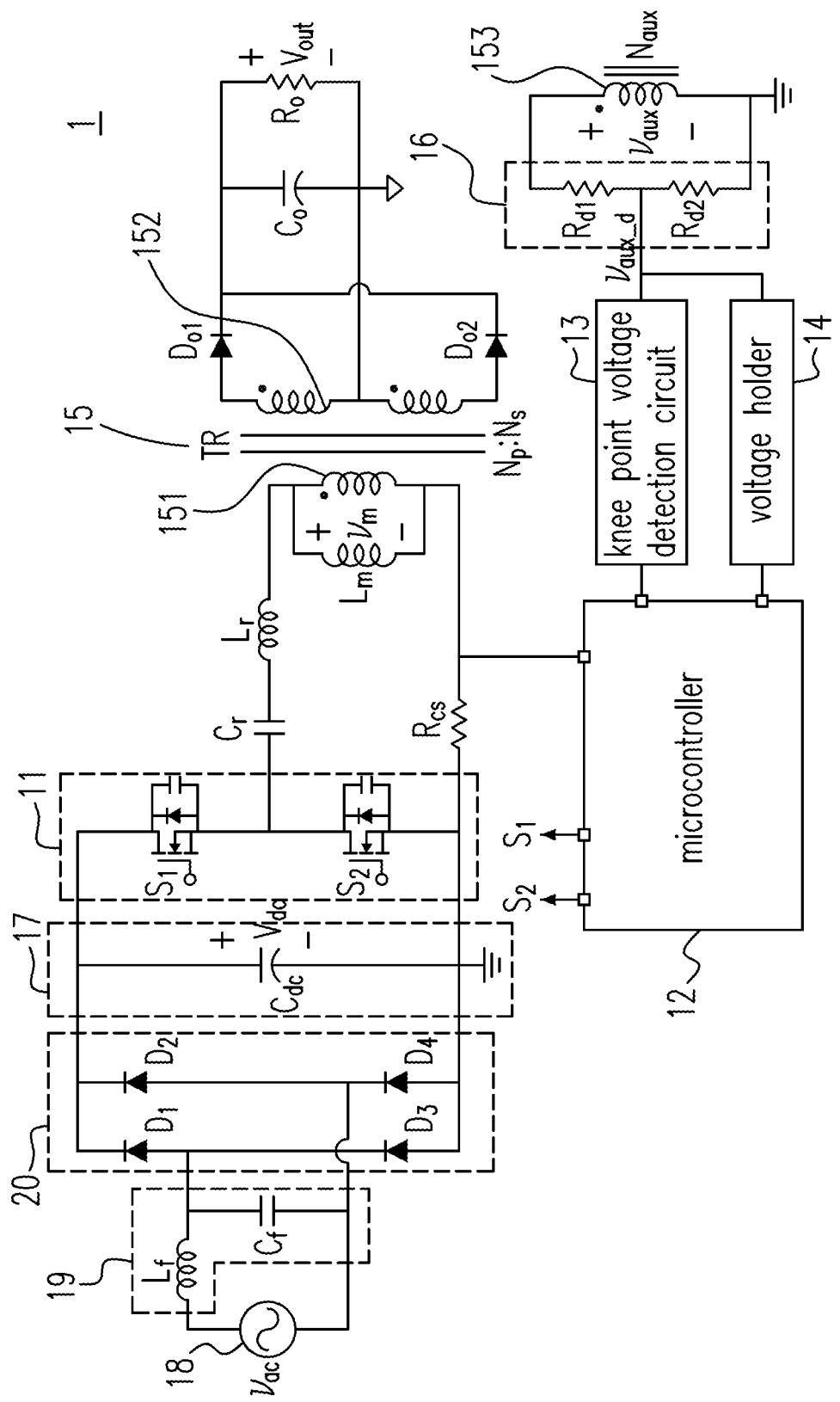
FIG. 1(a) is a schematic circuit diagram of an isolated half-bridge resonant converter according to the first preferred embodiment of the present invention.

FIG. 1(a) shows a schematic circuit diagram of an isolated half-bridge resonant converter according to the first preferred embodiment of the present invention. In FIG. 1(a), the isolated resonant converter 1 of the first preferred embodiment of the present invention is an isolated half-bridge resonant converter 1, has a switch set 11 (it is a half-bridge switch set 11) including a first switch $S_1$ and a second switch $S_2$, a microcontroller 12, a knee point voltage detection circuit 13, a voltage holder 14, a transformer 15 including a primary winding 151, a secondary winding 152 and an auxiliary winding 153, a voltage divider 16 including a first voltage dividing resistor $R_{d1}$ and a second voltage dividing resistor $R_{d2}$, a DC power source 17 including an input capacitor $C_{dc}$, an AC power source 18, a filter circuit 19 including a filter inductor $L_f$ and a filter capacitor $C_f$, a bridge rectifier 20 including a first to a fourth rectifying diodes $D_1$-$D_4$, an output capacitor $C_o$, a resonant capacitor $C_r$, a first output diode $D_{o1}$, a second output diode $D_{o2}$, an exciting inductor $L_m$, a resonant inductor $L_r$, a current sampling resistor $R_{cs}$ and an output resistor $R_o$.

Figure 1B:
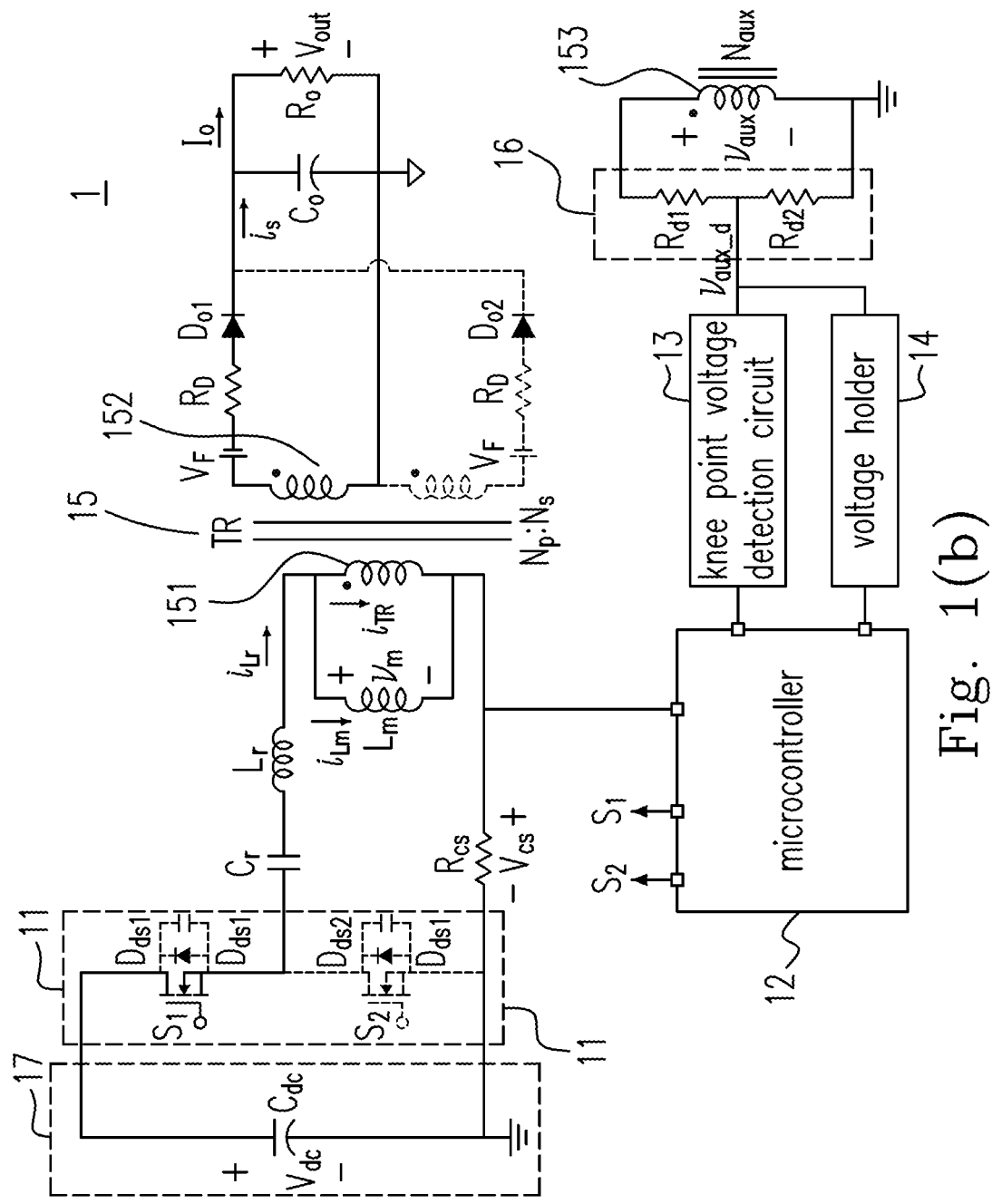
FIG. 1(b) is an equivalent schematic circuit diagram of the isolated half-bridge resonant converter as shown in FIG. 1(a).

FIG. 1(b) shows an equivalent schematic circuit diagram of the isolated half-bridge resonant converter as shown in FIG. 1(a). In FIG. 1(b), the AC power source 18, the filter circuit 19 and the bridge rectifier 20 are not shown, and the non-conducting portions are indicated by dotted lines, wherein $i_{Lr}$ is the current flowing through the resonant inductor, $i_{Lm}$ is the current flowing through the exciting inductor, $i_{TR}$ is the current flowing through the transformer, $i_s$ is the secondary current, $i_o$ is the output current, $V_{aux\_d}$ is the output voltage of the voltage divider 16, and $V_{out}$ is the output voltage.

1. Voltage Mode Control

For accurately estimating the output voltage, the first output diode $D_{o1}$ and the second output diode $D_{o2}$ are both equivalent to a forward voltage drop $V_F$ and an impedance $R_D$ electrically connected in series, and the leakage inductor on the secondary side is ignored. The voltage $V_{aux}(t)$ of the auxiliary winding 153 can be learned from the output voltage $V_o$ ($V_{out}$ in FIGS. 1(a)-1(b)) as shown in Equation (1):

$$v_{aux}(t) = \frac{N_{aux}}{N_s}[V_o + V_F + i_s(t) \cdot R_D], \quad (1)$$

wherein, $N_{aux}$ is a turn ratio of the auxiliary winding, $N_s$ is a turn ratio of the secondary winding, and $V_o$ is the output voltage.

The output voltage can be sorted out from Equation (1), and is shown in Equation (2):

$$V_o = v_{aux}(t) \cdot \frac{N_s}{N_{aux}} - V_F - i_s(t) \cdot R_D. \quad (2)$$

If the voltage value $V_{aux}(t)$ of the auxiliary winding 153 is obtained when the current $i_s$ is zero, then the influence of the cross voltage of the impedance $R_D$ electrically connected in series can be ignored, and thus the output voltage is shown in Equation (3):

$$V_o = v_{aux}(t) \cdot \frac{N_s}{N_{aux}} - V_F. \quad (3)$$

Figure 1C:
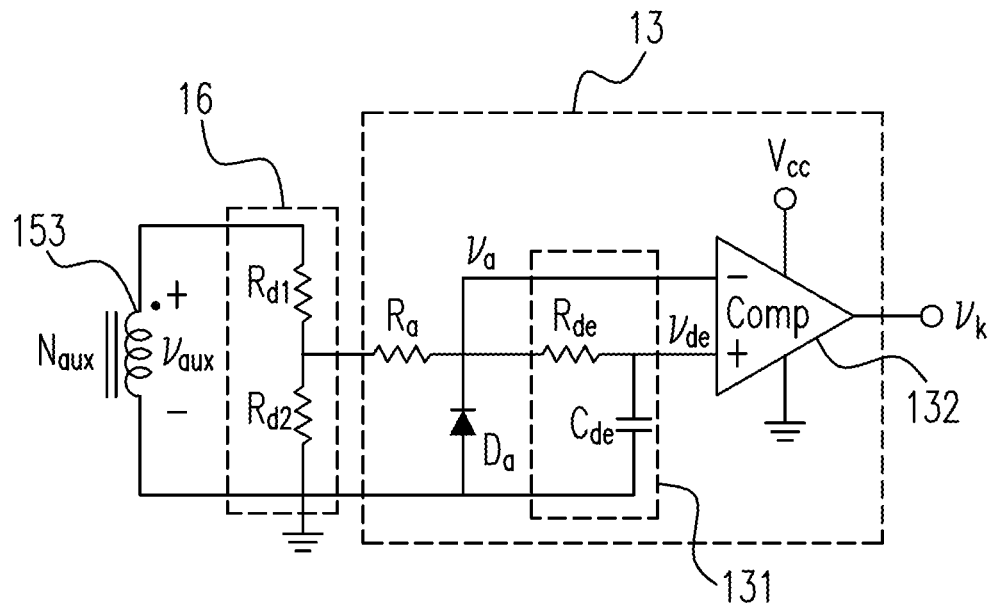
FIG. 1(c) is a circuit diagram of a knee point voltage detection circuit and a voltage divider of the isolated half-bridge resonant converter as shown in FIG. 1(a).

FIG. 1(c) shows a circuit diagram of a knee point voltage detection circuit and a voltage divider of the isolated half-bridge resonant converter as shown in FIG. 1(a). In FIG. 1(c), the knee point voltage detection circuit 13 includes an RC delay circuit 131, a comparator 132, a negative voltage clamping diode $D_a$ and a current limit resistor $R_a$. The RC delay circuit 131 has an output voltage of $V_k$ and includes a delay resistor $R_{de}$ and a delay capacitor $C_{de}$.

Figure 1D:
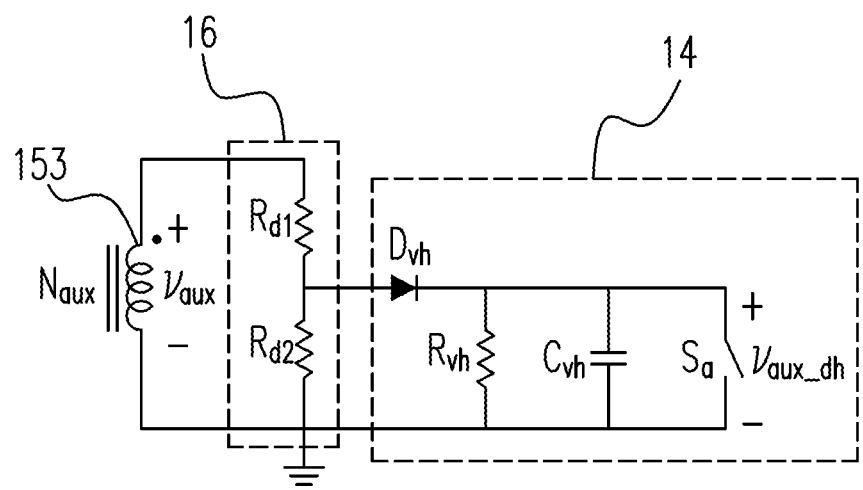
FIG. 1(d) is a circuit diagram of a voltage holder and the voltage divider of the isolated half-bridge resonant converter as shown in FIG. 1(a).

FIG. 1(d) shows a circuit diagram of a voltage holder and the voltage divider of the isolated half-bridge resonant converter as shown in FIG. 1(a). In FIG. 1(d), the voltage holder 14 includes a voltage holding diode $D_{vh}$, a voltage holding resistor $R_{vh}$, a voltage holding capacitor $C_{vh}$ and a auxiliary switch $S_a$, and a cross voltage of the auxiliary switch $S_a$ is $V_{aux\_dh}$.

As shown in FIG. 1(c), to detect when the current $i_s$ equals to zero, the present invention employs the idea of the knee point voltage detection to the auxiliary winding voltage. Via the RC delay circuit 131, causing the signal transmitted to the input positive terminal of the comparator 132 being delayed, when a voltage difference between the positive input terminal and the negative input terminal of the comparator is larger than a hysteresis voltage of the comparator, a second output signal of the comparator is a high potential, the second output signal is used as a trigger source for the microcontroller 12 to capture a voltage feedback signal of the isolated resonant converter. However, due to the use of the RC delay circuit 131, the microcontroller 12 cannot be timely triggered when the current $i_s$ equals to zero. Thus, as shown in FIG. 1(d), the voltage holder 14 is used so as to provide enough time for the microcontroller 12 to obtain the value, and to reset the voltage $V_{aux\_dh}$ on the voltage holder 14 through the auxiliary switch $S_a$ before the next switching period. The output voltage can be rewritten as shown in Equation (4):

$$V_o = [v_{aux\_dh}(t) + V_F] \cdot \frac{N_s}{N_{aux}} - V_F \quad (4)$$

Figure 1E:
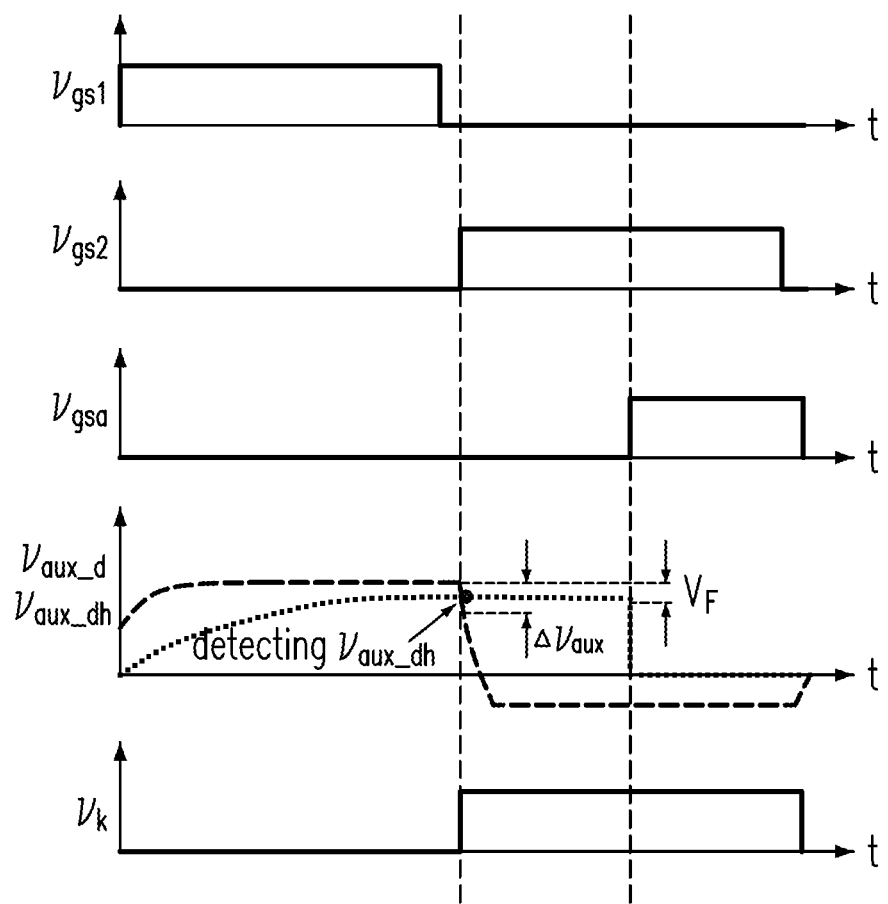
FIG. 1(e) shows waveform diagrams thereof when the voltage holder maintains the output voltage of the voltage divider until the auxiliary switch $S_a$ is turned on and the isolated half-bridge resonant converter as shown in FIG. 1(a) is operated in a series resonant converter (SRC) region.

FIG. 1(e) shows waveform diagrams thereof when the voltage holder maintains the output voltage of the voltage divider until the auxiliary switch $S_a$ is turned on and the isolated half-bridge resonant converter as shown in FIG. 1(a) is operated in a series resonant converter (SRC) region. $V_{gs1}$, $V_{gs2}$ and $V_{gsa}$ are the waveforms of the gate voltage of the first switch $S_1$, the second switch $S_2$ and the auxiliary switch $S_a$, $\Delta V_{aux}$ is an variation value of $V_{aux}$, $V_{aux\_d}$ is shown as the dashed line waveform, and $V_{aux\_dh}$ is shown as the dotted line waveform.

Figure 1F:
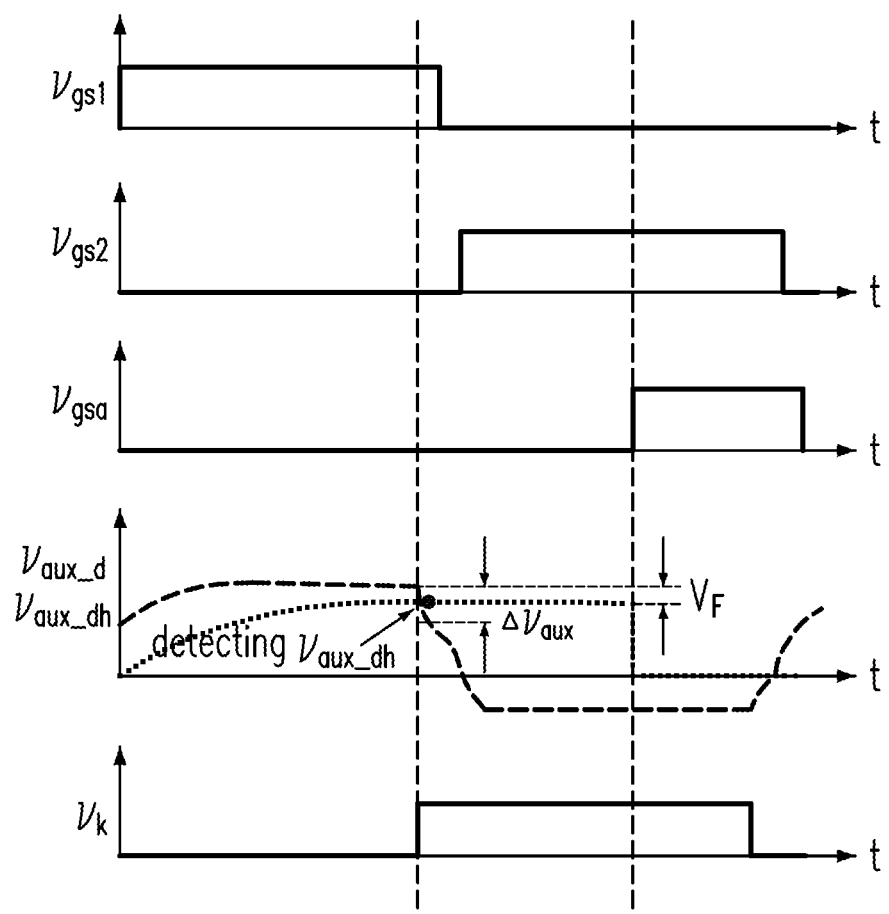
FIG. 1(f) shows waveform diagrams thereof when the voltage holder maintains the output voltage of the voltage divider until the auxiliary switch $S_a$ is turned on and the isolated half-bridge resonant converter as shown in FIG. 1(a) is operated in an LLC resonant converter (LLC) region.

FIG. 1(f) shows waveform diagrams thereof when the voltage holder maintains the output voltage of the voltage divider until the auxiliary switch $S_a$ is turned on and the isolated half-bridge resonant converter as shown in FIG. 1(a) is operated in an LLC resonant converter (LLC) region. The parameters therein are the same as those of FIG. 1(e).

Figure 2:
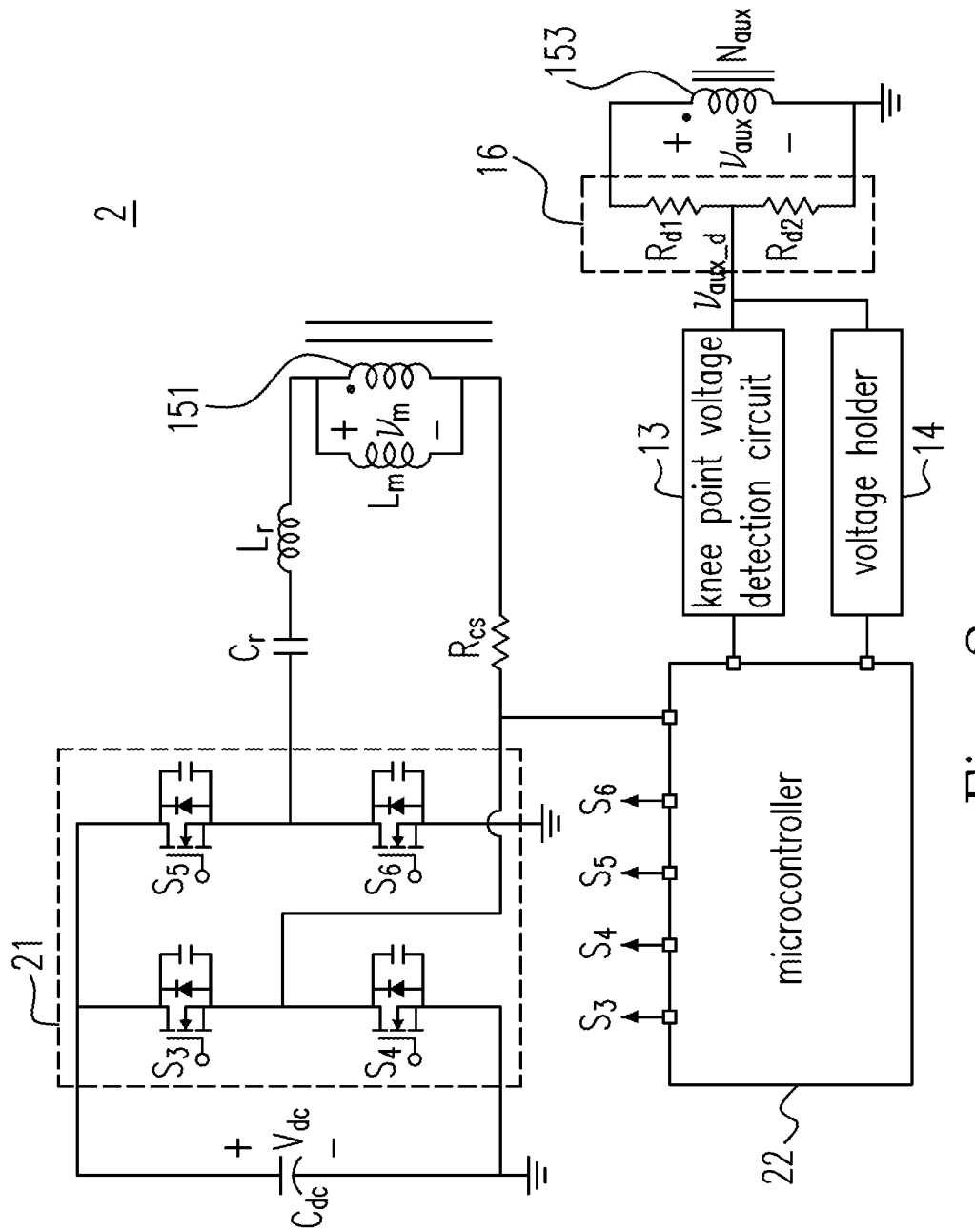
FIG. 2 is a schematic circuit diagram of an isolated full-bridge resonant converter according to the second preferred embodiment of the present invention.

FIG. 2 is a schematic circuit diagram of an isolated full-bridge resonant converter according to the second preferred embodiment of the present invention. In FIG. 2, the isolated resonant converter 2 is an isolated full-bridge resonant converter 2, and the differences between it and that of FIG. 1(a) are that the switch set 11 and the microcontroller 12 in FIG. 1(a) are replaced with a switch set 21 (it is a full-bridge switch set) including a third switch $S_3$ to a sixth switch $S_6$ and a microcontroller 22.

2. Current Mode Control

It can be seen from FIG. 1(b), the secondary current $i_s$ is a difference between the current flowing through the resonant inductor $i_{Lr}$ and the current flowing through the exciting inductor $i_{Lm}$, and is transferred to the secondary side through the transformer 15, as shown in Equation (5):

$$i_s(t) = n \cdot [i_{Lr}(t) - i_{Lm}(t)] \quad (5),$$

where n is a turn ratio of the primary side and the secondary side.

Due to the working principle of the circuit that the positive half-cycle and the negative half-cycle are in symmetry, thus the output current can be calculated as the average value of the secondary current in a half-cycle, as shown in Equation (6):

$$I_o = \frac{2}{T_s} \int_0^{\frac{T_s}{2}} i_s(t) \cdot dt = \frac{2}{T_s} \int_0^{\frac{T_s}{2}} n \cdot [i_{Lr}(t) - i_{Lm}(t)] \cdot dt. \quad (6)$$

Figure 3A:
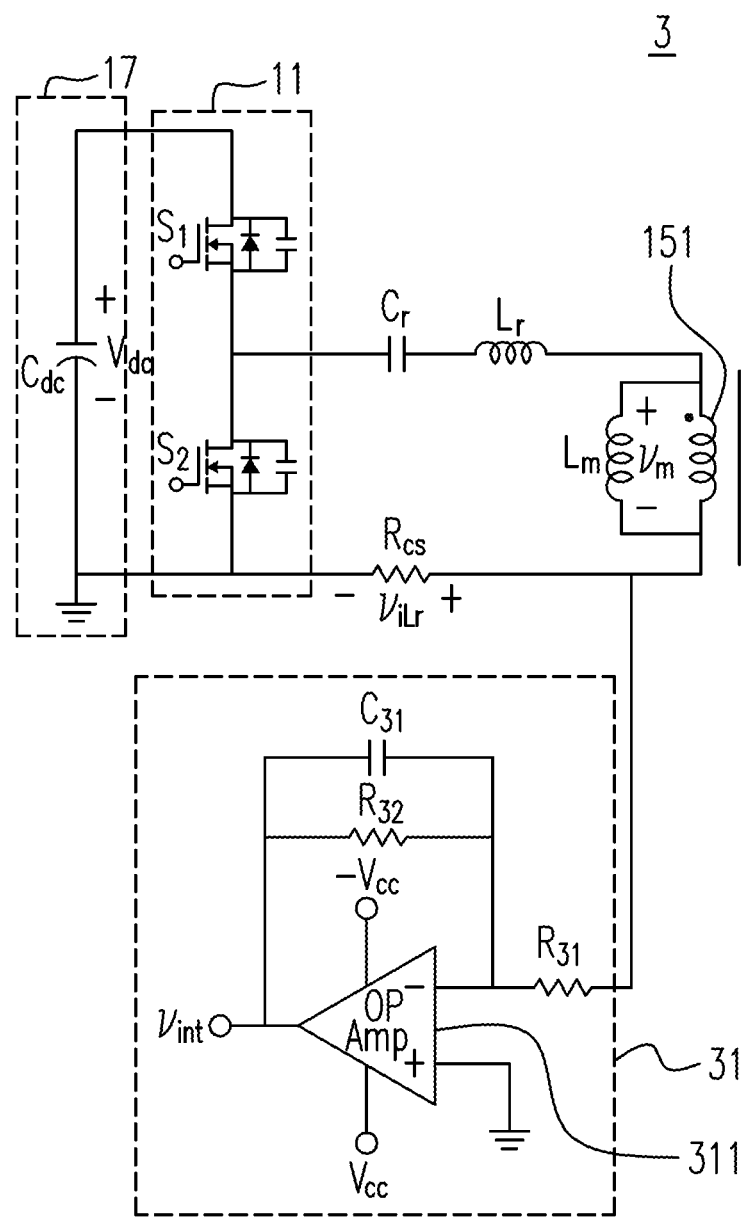
FIG. 3(a) is a circuit diagram of an isolated half-bridge resonant converter according to the third preferred embodiment of the present invention.

FIG. 3(a) shows a circuit diagram of an isolated half-bridge resonant converter according to the third preferred embodiment of the present invention. In FIG. 3(a), the isolated resonant converter 3 according to the third preferred embodiment of the present invention is an isolated half-bridge resonant converter 3, its circuit structure on the right-hand side of the primary winding 151 and the microcontroller 12 are the same as those in FIG. 1(a), and are thus omitted. FIG. 3(a) does not include the knee point voltage detection circuit 13 and the voltage holder 14, but includes an integrator 31. The integrator 31 is electrically connected to a second terminal of the primary winding 151 and the current sampling resistor $R_{cs}$ and includes an operational amplifier 311, a first capacitor $C_{31}$, a first resistor $R_{31}$ and a second resistor $R_{32}$. The output voltage of the integrator 31 is $V_{int}$. According to the calculation in Equation (6), the present invention employs the integrator 31 as shown in FIG. 3(a) to integrate the voltage $V_{cs}$ ($V_{iLr}$) on the current sampling resistor $R_{cs}$, and to estimate the output current of the isolated resonant converter $I_o$ via the microcontroller 12 (not shown).

Figure 3B:
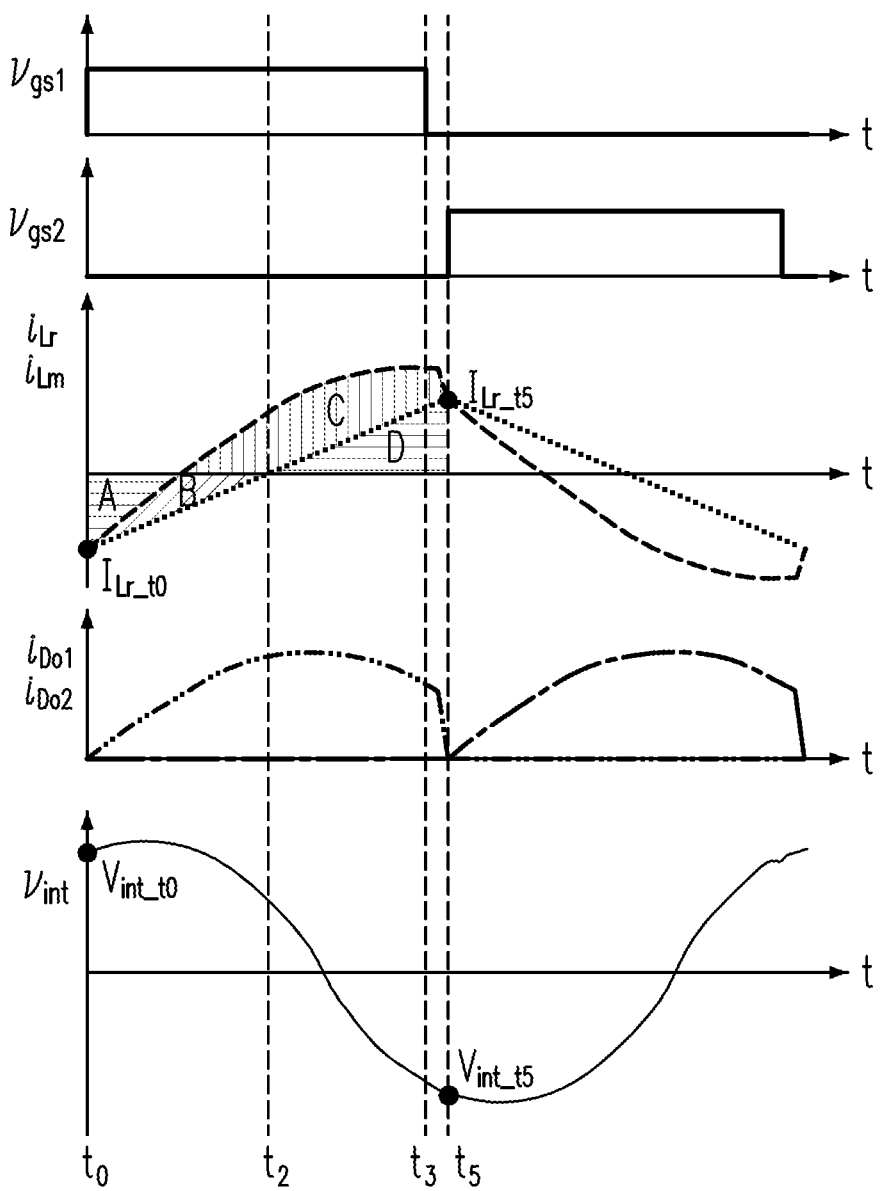
FIG. 3(b) shows waveform diagrams thereof when the isolated half-bridge resonant converter as shown in FIG. 3(a) is operated in an SRC region.

FIG. 3(b) shows waveform diagrams thereof when the isolated half-bridge resonant converter as shown in FIG. 3(a) is operated in an SRC region. $i_{Do1}$ is the current waveform of the first output diode, distributed on the top left of the diagram and the bottom right of the diagram on the transverse axis. $i_{Do2}$ is the current waveform of the second output diode, distributed on the top right of the diagram and the bottom left of the diagram on the transverse axis. $V_{int}$ shows the output voltage waveform of the integrator 31. $I_{Lr}$ is shown as the dashed line waveform, and $i_{Lm}$ is shown as the dotted line waveform. The output current of the isolated resonant converter can be sorted out as shown in equation (7):

$$I_o = \frac{2}{T_s} \int_0^{t_5} [i_{Lr}(t) - i_{Lm}(t)] \cdot dt = \frac{2}{T_s} \cdot Q_{sec} = \frac{2}{T_s} \cdot [B + C]. \quad (7)$$

Due to the slope of the current flowing through the exciting inductor is increasing linearly in the positive half-cycle, and the operating principle of the positive half-cycle and the negative half-cycle are in symmetry, thus the absolute values of $I_{Lr\_t0}$ and $I_{Lr\_t5}$ are equal, as shown in equation (8):

$$\left| \int_0^{t_2} i_{Lm}(t) \cdot dt \right| = A + B = \int_{t_2}^{t_5} i_{Lm}(t) \cdot dt = D. \quad (8)$$

The calculation results of the integrator 31 are shown in equation (9):

$$\int_0^{t_5} i_{Lt}(t) \cdot dt = Q_{int} = -A + C + D = |V_{int\_t0} - V_{int\_t5}|. \quad (9)$$

Substitute equation (8) into equation (9), and according to the inference of equation (7), the output current of the isolated resonant converter can be proved as shown in equation (10):

$$I_o = \frac{2}{T_s} \cdot [B + C] = \frac{2}{T_s} \cdot [(-A + D) + C] = \frac{2}{T_s} \int_0^{t_5} i_{Lr}(t) \cdot dt = \frac{2}{T_s} \cdot Q_{int}. \quad (10)$$

Figure 3C:
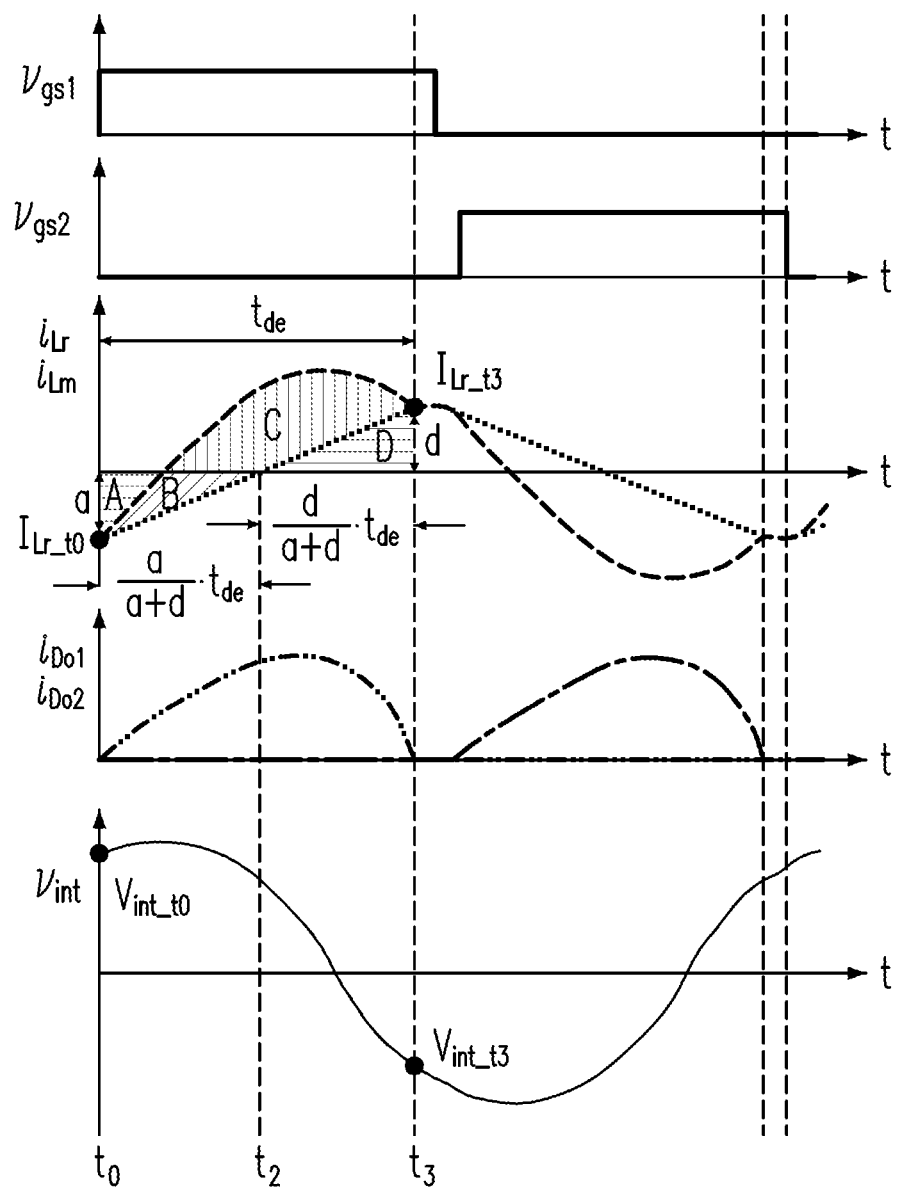
FIG. 3(c) shows waveform diagrams thereof when the isolated half-bridge resonant converter as shown in FIG. 3(a) is operated in an LLC region.

FIG. 3(c) shows waveform diagrams thereof when the isolated half-bridge resonant converter as shown in FIG. 3(a) is operated in an LLC region, and the parameters therein are the same as those in FIG. 3(b). Due to that when the transformer is decoupling, the energy won't be transferred to the second side via the transformer, thus the output current of the isolated resonant converter can be sorted out as shown in equation (11):

$$I_o = \frac{2}{T_s} \int_0^{t_3} [i_{Lr}(t) - i_{Lm}(t)] \cdot dt = \frac{2}{T_s} \cdot Q_{sec} = \frac{2}{T_s} \cdot [B + C]. \quad (11)$$

The calculation results of the integrator 31 are shown in equation (12):

$$\int_0^{t_3} i_{Lr}(t) \cdot dt = Q_{int} = -A + C + D = |V_{int\_t0} - V_{int\_t3}|. \quad (12)$$

Substitute equation (12) into equation (11), and due to the slopes of the current flowing through the exciting inductor in the positive half-cycle are not consistent, which cause that the absolute values of $I_{Lr\_t0}$ and $I_{Lr\_t5}$ are not equal, that is the areas A+B≠D, and thus the output current of the isolated resonant converter can be sorted out as shown in equation (13):

$$I_o = \frac{2}{T_s} \cdot [B + C] = \frac{2}{T_s} \cdot [(-A + C + D) + (A + B - D)] \quad (13)$$
$$= \frac{2}{T_s} \cdot [Q_{int} + (A + B - D)].$$

And the area A+B−D can be calculated as shown in equation (14):

$$A + B - D = \frac{1}{2} \cdot \frac{a}{a + d} \cdot t_{de} \cdot a - \frac{1}{2} \cdot \frac{d}{a + d} \cdot t_{de} \cdot d \quad (14)$$
$$= \frac{1}{2} \cdot \frac{t_{de}}{a + d} \cdot (a^2 - d^2) = \frac{1}{2} \cdot t_{de} \cdot (a - d),$$

where a and d indicate the absolute values of $I_{Lr\_t0}$ and $I_{Lr\_t3}$, $t_{de}$ is a time period beginning from a positive half-cycle of $T_S$ to the time when the decoupling of the transformer is happening, and it can be seen that the output current of the isolated resonant converter is shown in equation (15):

$$I_o = \frac{2}{T_s} \cdot \left[ Q_{int} + \frac{1}{2} \cdot t_{de} \cdot (a - d) \right] = \frac{2}{T_s} \cdot \left[ Q_{int} + \frac{1}{2} \cdot t_{de} |I_{Lr\_t0} + I_{Lr\_t3}| \right]. \quad (15)$$

Figure 4:
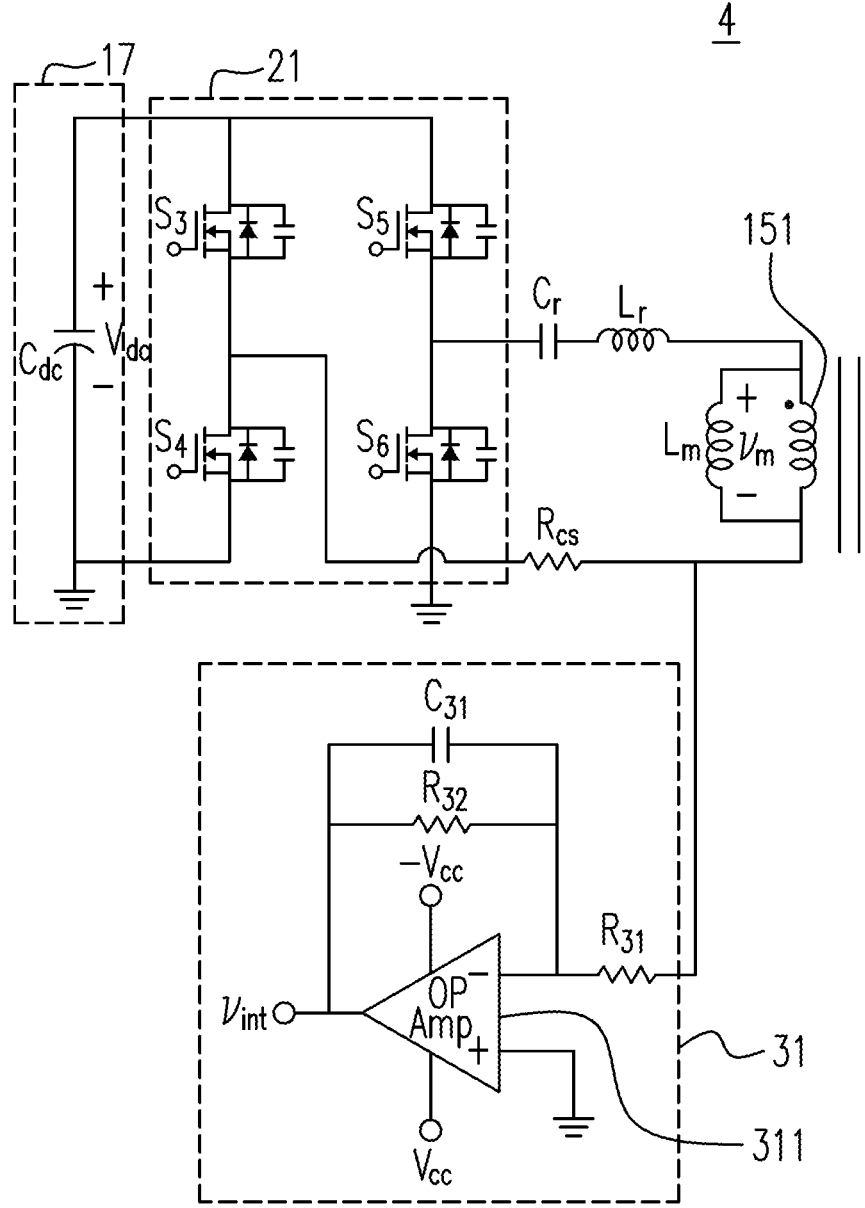
FIG. 4 is a circuit diagram of an isolated full-bridge resonant converter according to the fourth preferred embodiment of the present invention.

FIG. 4 is a circuit diagram of an isolated full-bridge resonant converter according to the fourth preferred embodiment of the present invention. In FIG. 4, the isolated resonant converter 4 is an isolated full-bridge resonant converter 4, and the differences between it and that of FIG. 3(a) are that the switch set 11 is replaced with a switch set 21 (in addition, the microcontroller 12 not shown in FIG. 3(a) is replaced with a microcontroller 22 not shown).

Figure 5A:
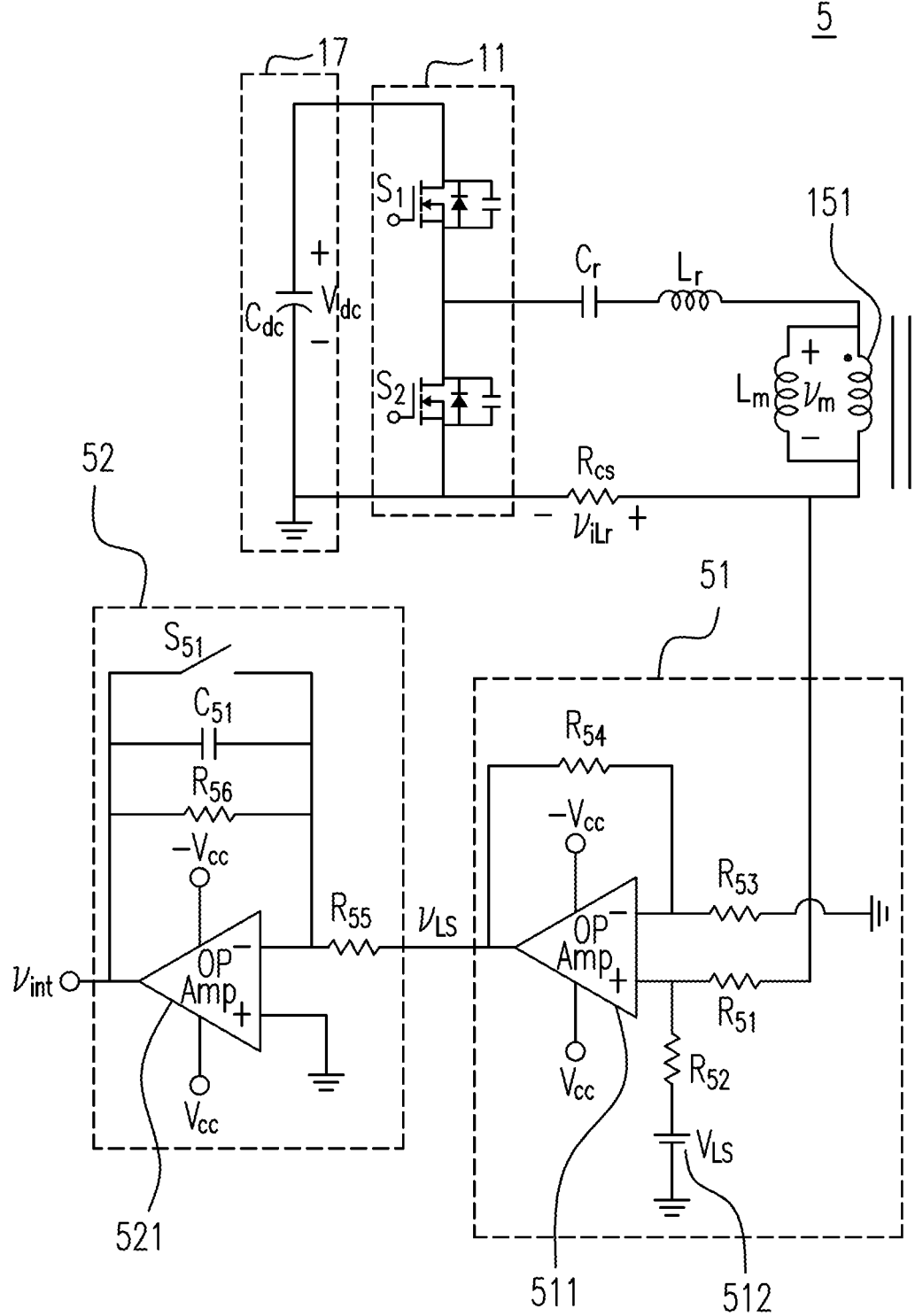
FIG. 5(a) is a circuit diagram of an isolated half-bridge resonant converter according to the fifth preferred embodiment of the present invention.

FIG. 5(a) is a circuit diagram of an isolated half-bridge resonant converter according to the fifth preferred embodiment of the present invention. In FIG. 5(a), the isolated resonant converter 5 is an isolated half-bridge resonant converter 5. The differences between the isolated half-bridge resonant converter 5 and the isolated half-bridge resonant converter 3 in FIG. 3(a) are that the integrator 31 is replaced with a voltage boosting circuit 51 and an integrator 52, wherein the DC power source 17 is a first DC power source 17, the voltage boosting circuit 51 includes a first operational amplifier 511, a second DC power source 512, a first resistor $R_{51}$, a second resistor $R_{52}$, a third resistor $R_{53}$ and a fourth resistor $R_{54}$. The integrator 52 is electrically connected to the voltage boosting circuit 51, and includes a second operational amplifier 521, a fifth resistor $R_{55}$, a sixth resistor $R_{56}$, a first capacitor $C_{51}$ and a reset switch $S_{51}$.

Another estimating method of the output current of the isolated resonant converter is to raise the cross voltage $V_{iLr}$ of the resonant current flowing through the current sampling resistor $R_{cs}$ by an added level, the purpose of the added level is to cause the cross voltage to be always larger than zero, and to be calculated by the integrator 52. However, to prevent the integrator 52 to achieve the saturation, a reset switch $S_{51}$ is electrically connected to the integrator 52 in parallel such that the results of the integrator 52 can be reset within each switching period as shown in FIG. 5(a).

Figure 5B:
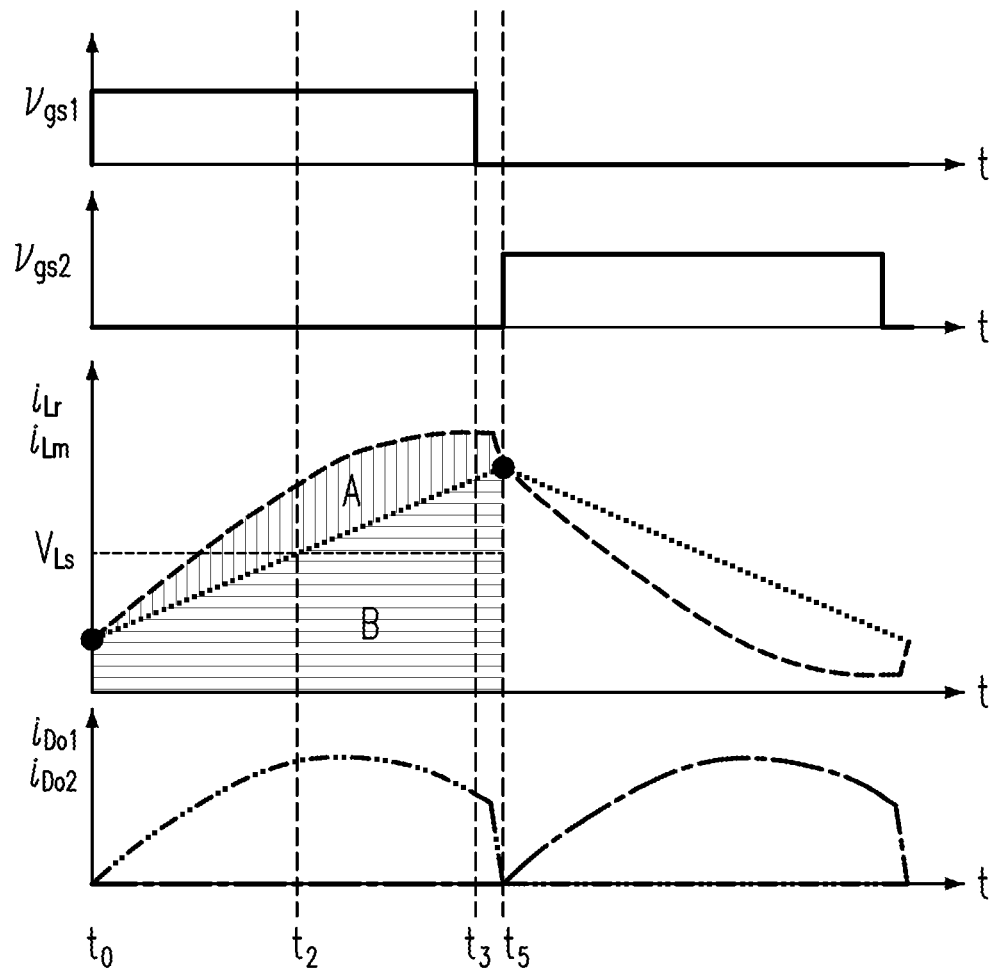
FIG. 5(b) shows waveform diagrams thereof when the isolated half-bridge resonant converter as shown in FIG. 5(a) is operated in an SRC region.

FIG. 5(b) shows waveform diagrams thereof when the isolated half-bridge resonant converter as shown in FIG. 5(a) is operated in an SRC region. Among the various parameters, $V_{LS}$ is the cross voltage of the second DC power source (or the raised level), and the remaining parameters are the same as those in FIG. 3(b). The output current of the isolated resonant converter is shown in Equation (16):

$$I_o = \frac{2}{T_s}\int_0^{t_5} [i_{Lr}(t) - i_{Lm}(t)] \cdot dt = \frac{2}{T_s} \cdot A. \tag{16}$$

The calculation results via the integrator 52 are shown in equation (17):

$$\int_0^{t_5} i_{Lr}(t) \cdot dt = Q_{int} = A + B \tag{17}$$

The average value of area B is the raised level of voltage $V_{LS}$, and thus the output current of the isolated resonant converter is shown in Equation (18):

$$I_o = \frac{2}{T_s} \cdot [A + B] - V_{LS}. \tag{18}$$

Figure 5C:
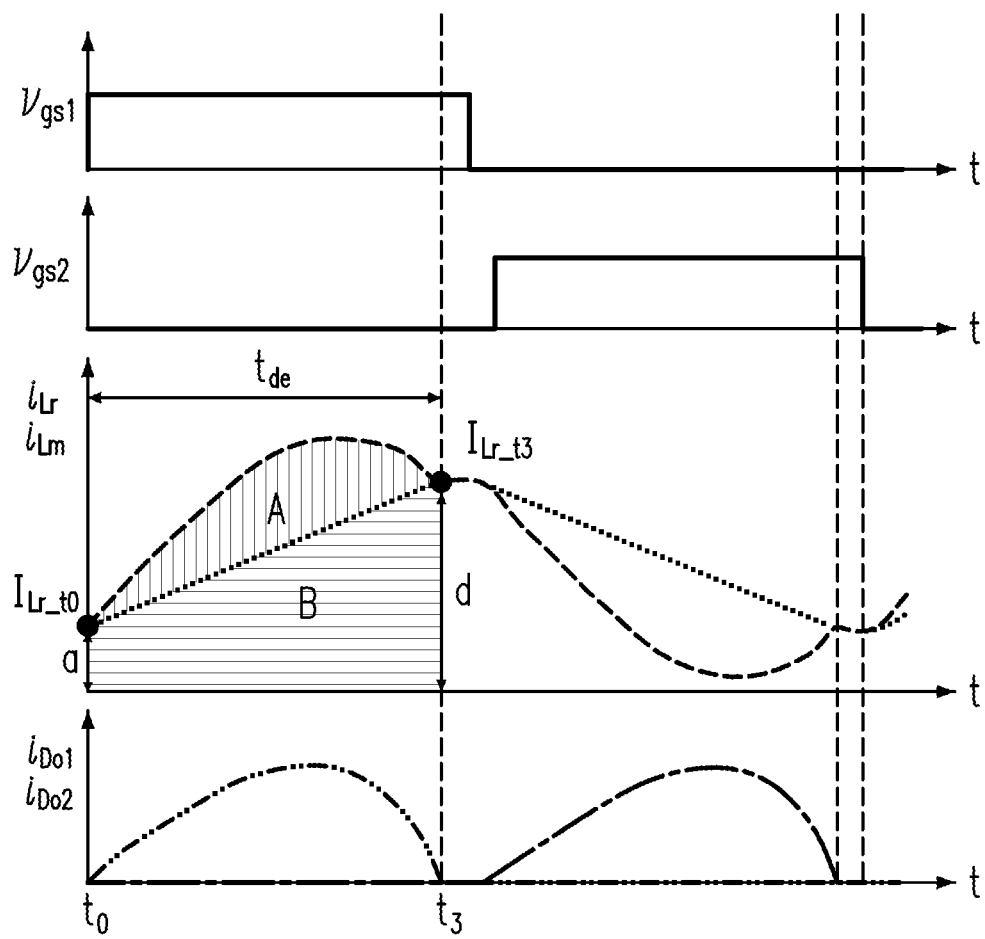
FIG. 5(c) shows waveform diagrams thereof when the isolated half-bridge resonant converter as shown in FIG. 5(a) is operated in an LLC region.

FIG. 5(c) shows waveform diagrams thereof when the isolated half-bridge resonant converter as shown in FIG. 5(a) is operated in an LLC region. Its parameters are the same as those in FIG. 3(c). The output current of the isolated resonant converter is shown as in Equation (19):

$$I_o = \frac{2}{T_s}\int_0^{t_3} [i_{Lr}(t) - i_{Lm}(t)] \cdot dt = \frac{2}{T_s} \cdot A. \tag{19}$$

The calculation results via the integrator 52 are shown in equation (20):

$$\int_0^{t_3} i_{Lr}(t) \cdot dt = Q_{int} = A + B. \tag{20}$$

The slopes of the current flowing through the exciting inductor in the positive half-cycle are not consistent due to the decoupling of the transformer, and thus the calculations of area B are shown in Equation (21):

$$B = \frac{1}{2} \cdot (a+d) \cdot t_{de} = \frac{1}{2} \cdot (I_{Lr\_t0} + I_{Lr\_t3}) \cdot t_{de} \tag{21}$$

The output current of the isolated resonant converter can be sorted out as shown in equation (22):

$$I_o = \frac{2}{T_s}\int_0^{t_3} [i_{Lr}(t) - i_{Lm}(t)] \cdot dt = \frac{2}{T_s}\left[(A + B) - \frac{1}{2} \cdot (I_{Lr\_t0} + I_{Lr\_t3}) \cdot t_{de}\right]. \tag{22}$$

Figure 6:
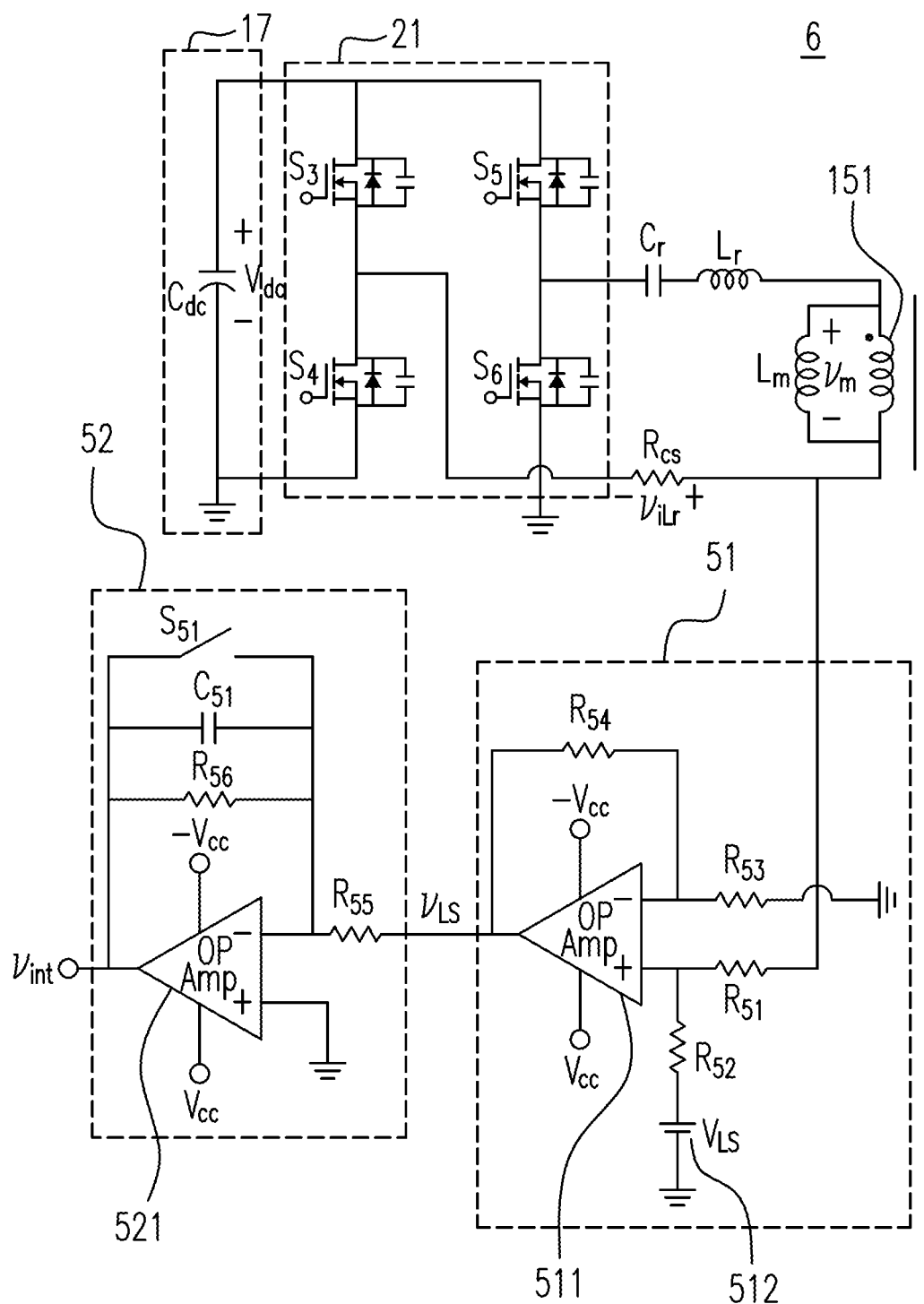
FIG. 6 is a circuit diagram of an isolated full-bridge resonant converter according to the sixth preferred embodiment of the present invention.

FIG. 6 shows a circuit diagram of an isolated full-bridge resonant converter according to the sixth preferred embodiment of the present invention. The isolated resonant converter 6 is an isolated full-bridge resonant converter 6, and the differences between it and that of FIG. 5(a) are that the switch set 11 is replaced with a switch set 21 (in addition, the microcontroller 12 not shown in FIG. 5(a) is replaced with a microcontroller 22 not shown).

EMBODIMENTS

1. A method for estimating an output current of an isolated resonant converter, wherein the isolated resonant converter has a switch switching period $T_S$, a transformer including a primary winding having a first and a second terminals, a resonant inductor electrically connected to the first terminal, a current sampling resistor electrically connected between the second terminal and a ground, a first and a second output terminals, an output resistor $R_O$ electrically connected to the first and the second output terminals in parallel, and an integrator electrically connected to the current sampling resistor in parallel, comprising:
integrating a cross voltage of the current sampling resistor via the integrator to obtain the output current, wherein when the isolated resonant converter is operated in a series resonant converter (SRC) region, the output current $I_o = (2/T_s)|V_{int\_t0} - V_{int\_t5}|$, when the isolated resonant converter is operated in an LLC resonant converter (LLC) region, the output current $I_O = (2/T_s)(|V_{int\_t0} - V_{int\_t3}| + (\frac{1}{2})t_{de}|I_{Lr\_t0} - I_{Lr\_t3}|)$, where $t_0 = 0$, $t_3$ is the time when a decoupling of the transformer is happening, $t_5 = T_s/2$, $V_{int\_t0}$ is an output voltage of the integrator at time $t_0$, $V_{int\_t3}$ is an output voltage of the integrator at time $t_3$, $V_{int\_t5}$ is an output voltage of the integrator at time $t_5$, $t_{de}$ is a time period beginning from a positive half-cycle of $T_S$ to the time when the decoupling of the transformer is happening, $I_{Lr\_t0}$ is a current flowing through the resonant inductor at time $t_0$, $I_{Lr\_t3}$ is a current flowing through the resonant inductor at time $t_3$, and $V_o = I_o * R_o$, where $V_o$ is an output voltage of the isolated resonant converter.

2. The method according to Embodiment 1, wherein the isolated resonant converter further includes a DC power source, a switch set electrically connected to the DC power source in parallel, and a resonant capacitor electrically connected between the switch set and the resonant inductor, the integrator includes an operational amplifier having a positive input terminal, a negative input terminal, and an amplifier output terminal, a first resistor, a second resistor and a first capacitor, the first resistor is electrically connected between the second terminal and the negative input terminal, the positive input terminal is electrically connected to the ground, the second resistor is electrically connected between the negative input terminal and the amplifier output terminal, and the first capacitor is electrically connected to the second resistor in parallel, wherein the isolated resonant converter is one of an isolated half-bridge resonant converter and an isolated full-bridge resonant converter, the switch set of the isolated half-bridge resonant converter is a half-bridge switch set, and the switch set of the isolated full-bridge resonant converter is a full-bridge switch set.

3. A method for estimating an output current of an isolated resonant converter, wherein the isolated resonant converter has a switch switching period $T_S$, a transformer including a primary winding having a first and a second terminals, an exciting inductor electrically connected to the primary winding in parallel, a resonant inductor electrically connected to the first terminal, a current sampling resistor electrically connected between the second terminal and a ground, a voltage boosting circuit electrically connected between the current sampling resistor and the ground, a first and a second output terminals, an output resistor $R_O$ electrically connected to the first and the second terminals in parallel, and an integrator electrically connected to the voltage boosting circuit, comprising:

boosting a cross voltage of the current sampling resistor to have an added level via the voltage boosting circuit, wherein the level $V_{LS}=(\frac{1}{2})(I_{Lm\_t0}-I_{Lm\_t5})$, $I_{Lm\_t0}$ is a current flowing through the exciting inductor at time $t_0$, and $I_{Lm\_t5}$ is a current flowing through the exciting inductor at time $t_5$; and integrating the cross voltage with the added level via the integrator to obtain the output current, wherein when the isolated resonant converter is operated in an SRC region, the output current $I_o=(2/T_s)(\int_0^{t5} i_{Lr}(t)dt-(\frac{1}{2})\ (I_{Lm\_t0}-I_{Lm\_t5}))$, where $t_0=0$, $t_5=T_s/2$, $i_{Lr}(t)$ is a current flowing through the resonant inductor at time t, when the isolated resonant converter is operated in an LLC region, the output current $I_O=(2/T_s)(\int_0^{t3} i_{Lr}(t)dt-(\frac{1}{2})(I_{Lr\_t0}-I_{Lr\_t3})t_{de})$, where $t_3$ is the time when a decoupling of the transformer is happening, $I_{Lr\_t0}$ is a current flowing through the resonant inductor at time $t_0$, $I_{Lr\_t3}$ is a current flowing through the resonant inductor at time $t_3$, $t_{de}$ is a time period beginning from a positive half-cycle of $T_S$ to the time when the decoupling of the transformer is happening, and $V_o=I_o R_o$, where $V_o$ is an output voltage of the isolated resonant converter.

4. The method according to Embodiment 3, wherein the isolated resonant converter further includes a first DC power source, a switch set electrically connected to the first DC power source in parallel, a resonant capacitor electrically connected between the switch set and the resonant inductor, the voltage boosting circuit includes a first operational amplifier having a first positive input terminal, a first negative input terminal, and a first amplifier output terminal, a second DC power source, and a first to a fourth resistors, the first resistor is electrically connected between the second terminal and the first positive input terminal, the second resistor is electrically connected between an end of the second DC power source and the first positive input terminal, the other end of the second DC power source is electrically connected to the ground, the third resistor is electrically connected between the ground and the first negative input terminal, the fourth resistor is electrically connected between the first amplifier output terminal and the first negative input terminal, the integrator includes a second operational amplifier having a second positive input terminal, a second negative input terminal and a second amplifier output terminal, a fifth resistor, a sixth resistor, a first capacitor and a reset switch, the fifth resistor is electrically connected between the first amplifier output terminal and the second negative input terminal, the second positive input terminal is electrically connected to the ground, the sixth resistor is electrically connected between the second negative input terminal and the second amplifier output terminal, the first capacitor is electrically connected to the sixth resistor in parallel, the reset switch is electrically connected to the first capacitor in parallel, and the reset switch is used to cause an integration result of the integrator to be reset in each switching period, wherein the isolated resonant converter is one of an isolated half-bridge resonant converter and an isolated full-bridge resonant converter, the switch set of the isolated half-bridge resonant converter is a half-bridge switch set, and the switch set of the isolated full-bridge resonant converter is a full-bridge switch set.

5. A method for estimating an output voltage of an isolated resonant converter, wherein the isolated resonant converter includes a transformer having an auxiliary winding and a secondary winding, a first output diode electrically connected to the secondary winding in series, a first and a second output terminals, an output resistor $R_o$ electrically connected to the first and the second output terminals in parallel, and a voltage holder coupled to the auxiliary winding, comprising:

obtaining the output voltage $$V_o = [v_{aux\_dh}(t) + V_F] \cdot \frac{N_s}{N_{aux}} - V_F,$$

where $v_{aux\_dh}(t)$ is an output voltage of the voltage holder, $V_F$ is a forward voltage drop of the first output diode, $N_S$ is a number of turns of the secondary winding, $N_{aux}$ is a number of turns of the auxiliary winding, and $V_o=I_o*R_o$, wherein $V_o$ is the output voltage of the isolated resonant converter.

6. The method according to Embodiment 5, wherein the isolated resonant converter further includes a primary winding having a first and a second terminals, an exciting inductor electrically connected to the primary winding in parallel, a DC power source, a switch set electrically connected to the DC power source in parallel, a resonant inductor electrically connected to the first terminal, a resonant capacitor electrically connected between the switch set and the resonant inductor, a current sampling resistor electrically connected between the second terminal and a ground and a voltage divider electrically connected to the auxiliary winding in parallel and having a first signal output terminal, the voltage holder is electrically connected to the voltage divider in parallel and includes a voltage holding diode having a first anode and a first cathode, a voltage holding resistor, a voltage holding capacitor and an auxiliary switch, the first anode is electrically connected to the first signal output terminal, the voltage holding resistor is electrically connected between the first cathode and the ground, the voltage holding capacitor is electrically connected to the voltage holding resistor in parallel, the auxiliary switch is electrically connected to the voltage holding capacitor in parallel, the auxiliary switch is used to reset a voltage on the voltage holder before next switching period, wherein the isolated resonant converter is one of an isolated half-bridge resonant converter and an isolated full-bridge resonant converter, the switch set of the isolated half-bridge resonant converter is a half-bridge switch set, and the switch set of the isolated full-bridge resonant converter is a full-bridge switch set.

7. The method according to Embodiment 5 or 6, wherein the isolated resonant converter further includes a knee point voltage detection circuit and a microcontroller, the knee point voltage detection circuit includes a current limit resistor, a negative voltage clamping diode having a second anode and a second cathode, an RC delay circuit and a comparator having a positive input terminal, a negative input terminal and a second signal output terminal, the RC delay circuit includes a delay resistor and a delay capacitor, the current limit resistor is electrically connected between the first signal output terminal and the negative input terminal, the second cathode is electrically connected to the negative input terminal, the second anode is electrically connected to the ground, the delay resistor is electrically connected between the second cathode and the positive input terminal, the delay capacitor is electrically connected to the positive input terminal and the ground, the second signal output terminal is electrically connected to the microcontroller, a first output signal of the first signal output terminal is delayed to be transmitted to the positive input terminal via the RC delay circuit, when a voltage difference between the positive input terminal and the negative input terminal of the comparator is larger than a hysteresis voltage of the comparator, a second output signal of the comparator is a high potential, the second output signal is used as a trigger source for the microcontroller to capture a voltage feedback signal of the isolated resonant converter, and the voltage holder maintains the output voltage $v_{aux\_dh}(t)$ at a predetermined level until the auxiliary switch is turned on such that the microcontroller has enough time to get a voltage value of the auxiliary winding when a secondary current of the isolated resonant converter is zero.

8. The method according to any one of the above-captioned Embodiments, wherein the microcontroller receives the output voltage of the voltage holder and the second output signal to estimate the voltage value of the auxiliary winding when the secondary current of the isolated resonant converter is zero, and then to estimate the output voltage $V_o$ of the isolated resonant converter.

9. The method according to any one of the above-captioned Embodiments, wherein the isolated resonant converter further includes an AC power source, a filter circuit and a bridge rectifier, the filter circuit is electrically connected to the AC power source in parallel, the bridge rectifier is electrically connected to the filter circuit in parallel, the DC power source is electrically connected to the bridge rectifier in parallel, the DC power source is an input capacitor having a first terminal and a second terminal, the half-bridge switch set includes a first and a second switches, each of which has a first terminal, a second terminal and a control terminal, the first terminal of the first switch is electrically connected to the first terminal of the input capacitor, the second terminal of the first switch is electrically connected to the first terminal of the second switch and the resonant capacitor, the second terminal of the second switch is electrically connected to the second terminal of the input capacitor and the ground, the control terminals of the first and the second switches are electrically connected to the microcontroller, the full-bridge switch set includes a third switch to a sixth switch, each of which has a first terminal, a second terminal and a control terminal, the first terminal of the third switch is electrically connected to the first terminal of the input capacitor, the second terminal of the third switch is electrically connected to the first terminal of the fourth switch and the current sampling resistor, the second terminal of the fourth switch is electrically connected to the second terminal of the input capacitor and the ground, the first terminal of the fifth switch is electrically connected to the first terminal of the input capacitor, the second terminal of the fifth switch is electrically connected to the resonant capacitor and the first terminal of the sixth switch, the second terminal of the sixth switch is electrically connected to the ground, and the control terminals of the third switch to the sixth switch are electrically connected to the microcontroller.

10. The method according to Embodiment 5, wherein the isolated resonant converter further includes a second output diode and an output capacitor, the secondary winding has a first terminal, a second terminal and a central tap, each of the first and the second output diodes has an anode and a cathode, the anode of the first output diode is electrically connected to the first terminal of the secondary winding, the cathode of the first output diode is electrically connected to the cathode of the second output diode, the anode of the second output diode is electrically connected to the second terminal of the secondary winding, the output capacitor is electrically connected to the cathode of the first output diode and the central tap, the output resistor is electrically connected to the output capacitor in parallel, the central tap is electrically connected to a ground, and a cross voltage of the output resistor is the output voltage $V_o$ of the isolated resonant converter.

According to the aforementioned descriptions, the present invention discloses a method for estimating an output current or an output voltage of isolated resonant converter, belonging to a primary side feedback control method, omitting the feedback circuit comprising the opto-coupler to decrease the cost and volume of the isolated resonant converters, and being applicable to various application situations, and thus the proposed method has non-obviousness and novelty.

While the invention has been described in terms of what is presently considered to be the most practical and preferred embodiments, it is to be understood that the invention need not be limited to the disclosed embodiments. Therefore, it is intended to cover various modifications and similar configurations included within the spirit and scope of the appended claims, which are to be accorded with the broadest interpretation so as to encompass all such modifications and similar structures.

What is claimed is:

1. A method for estimating an output current of an isolated resonant converter, wherein the isolated resonant converter has a switch switching period Ts, a transformer including a primary winding having a first and a second terminals, a resonant inductor electrically connected to the first terminal, a current sampling resistor electrically connected between the second terminal and a ground, a first and a second output terminals, an output resistor Ro electrically connected to the first and the second output terminals in parallel, and an integrator electrically connected to the current sampling resistor in parallel, comprising:

integrating a cross voltage of the current sampling resistor via the integrator to obtain the output current, wherein when the isolated resonant converter is operated in a series resonant converter (SRC) region, the output current Io=(2/Ts)|Vint_t0-Vint_t5|, when the isolated resonant converter is operated in an LLC resonant converter (LLC) region, the output current Io=(2/Ts)(|Vint_t0-Vint_t3|+(1/2)tde|ILr_t0-ILr_t3|), where t0=0, t3 is a time when a decoupling of the transformer is happening, t5=Ts/2, Vint_t0 is an output voltage of the integrator at time t0, Vint_t3 is an output voltage of the integrator at time t3, Vint_t5 is an output voltage of the integrator at time t5, tde is a time period beginning from a positive half-cycle of Ts to a time when the decoupling of the transformer is happening, ILr_t0 is a current flowing through the resonant inductor at time t0, ILr_t3 is a current flowing through the resonant inductor at time t3, and Vo=Io*Ro, where Vo is an output voltage of the isolated resonant converter.

2. The method according to claim 1, wherein the isolated resonant converter further includes a DC power source, a switch set electrically connected to the DC power source in parallel, and a resonant capacitor electrically connected between the switch set and the resonant inductor, the integrator includes an operational amplifier having a positive input terminal, a negative input terminal, and an amplifier output terminal, a first resistor, a second resistor and a first capacitor, the first resistor is electrically connected between the second terminal and the negative input terminal, the positive input terminal is electrically connected to the ground, the second resistor is electrically connected between the negative input terminal and the amplifier output terminal, and the first capacitor is electrically connected to the second resistor in parallel, wherein the isolated resonant converter is one of an isolated half-bridge resonant converter and an isolated full-bridge resonant converter, the switch set of the isolated half-bridge resonant converter is a half-bridge switch set, and the switch set of the isolated full-bridge resonant converter is a full-bridge switch set.

3. A method for estimating an output current of an isolated resonant converter, wherein the isolated resonant converter has a switch switching period Ts, a transformer including a primary winding having a first and a second terminals, an exciting inductor electrically connected to the primary winding in parallel, a resonant inductor electrically connected to the first terminal, a current sampling resistor electrically connected between the second terminal and a ground, a voltage boosting circuit electrically connected between the current sampling resistor and the ground, a first and a second output terminals, an output resistor Ido electrically connected to the first and the second terminals in parallel, and an integrator electrically connected to the voltage boosting circuit, comprising:
    boosting a cross voltage of the current sampling resistor to have an added level via the voltage boosting circuit, wherein the added level VLS=(1/2)(ILm_t0-ILm_t5), ILm_t0 is a current flowing through the exciting inductor at time t0, and ILm_t5 is a current flowing through the exciting inductor at time t5 and
    integrating the cross voltage with the added level via the integrator to obtain the output current, wherein when the isolated resonant converter is operated in an SRC region, the output current Io=(2/Ts)(∫0t5iLr(t)dt-(1/2)(ILm_t0-ILm_t5)), where t0=0, t5=Ts/2, iLr(t) is a current flowing through the resonant inductor at time t, when the isolated resonant converter is operated in an LLC region, the output current Io=(2/Ts)(∫0t3iLr(t)dt-(1/2)(ILr_t0+ILr_t3)tde), where t3 is a time when a decoupling of the transformer is happening, ILr_t0 is a current flowing through the resonant inductor at time t0, ILr_t3 is a current flowing through the resonant inductor at time t3. tde is a time period beginning from a positive half-cycle of Ts to a time when the decoupling of the transformer is happening, and Vo=Io*Ro, where Vo is an output voltage of the isolated resonant converter.

4. The method according to claim 3, wherein the isolated resonant, converter further includes a first DC power source, a switch set electrically connected to the first DC power source in parallel, a resonant capacitor electrically connected between the switch set and the resonant inductor, the voltage boosting circuit includes a first operational amplifier having a first positive input terminal, a first negative input terminal, and a first amplifier output terminal, a second DC power source, and a first to a fourth resistors, the first resistor is electrically connected between the second terminal and the first positive input terminal, the second resistor is electrically connected between an end of the second DC power source and the first positive input terminal, the other end of the second DC power source is electrically connected to the ground, the third resistor is electrically connected between the ground and the first negative input terminal, the fourth resistor is electrically connected between the first operational amplifier output terminal and the first negative input terminal, the integrator includes a second operational amplifier having a second positive input terminal, a second negative input terminal and a second amplifier output terminal, a fifth resistor, a sixth resistor, a first capacitor and a reset switch, the fifth resistor is electrically connected between the first operational amplifier output terminal and the second negative input terminal, the second positive input terminal is electrically connected to the ground, the sixth resistor is electrically connected between the second negative input terminal and the second amplifier output terminal, the first capacitor is electrically connected to the sixth resistor in parallel, the reset switch is electrically connected to the first capacitor parallel, and the reset switch is used to cause an integration result of the integrator to be reset in each switching period, wherein the isolated resonant converter is one of an isolated half-bridge resonant converter and an isolated full-bridge resonant converter, the switch set of the isolated half-bridge resonant converter is a half-bridge switch set, and the switch set of the isolated full-bridge resonant converter is a full-bridge switch set.

5. A method for estimating an output voltage of an isolated resonant converter, wherein the isolated resonant converter includes a transformer having an auxiliary winding and a secondary winding, a first output diode electrically connected to the secondary winding in series, a first and a second output terminals, an output resistor Ro electrically connected to the first and the second output terminals in parallel, and a voltage holder coupled to the auxiliary winding, comprising:
    obtaining the output voltage $$V_o = [v_{aux\_dh}(t) + V_F] \cdot \frac{N_s}{N_{aux}} - V_F,$$

where vaux dh(t) is an output voltage of the voltage holder, VF is a forward voltage drop of the first output diode, Ns is a number of turns of the secondary winding, Naux is a number of turns of the auxiliary winding, and Vo=Io*Ro, wherein Vo is the output voltage of the isolated resonant converter.

6. The method according to claim 5, wherein the isolated resonant converter further includes a primary winding having a first and a second terminals, an exciting inductor electrically connected to the primary winding in parallel, a DC power source, a switch set electrically connected to the DC power source in parallel, a resonant inductor electrically connected to the first terminal, a resonant capacitor electrically connected between the switch set and the resonant inductor, a current sampling resistor electrically connected between the second terminal and a ground and a voltage divider electrically connected to the auxiliary winding in parallel and having a first signal output terminal, the voltage holder is electrically connected to the voltage divider in parallel and includes a voltage holding diode having a first anode and a first cathode, a voltage holding resistor, a voltage holding capacitor and an auxiliary switch, the first anode is electrically connected to the first signal output terminal, the voltage holding resistor is electrically connected between the first cathode and the ground, the voltage holding capacitor is electrically connected to the voltage holding resistor in parallel, the auxiliary switch is electrically connected to the voltage holding capacitor in parallel, the auxiliary switch is used to reset a voltage on the voltage holder before a next switching period, wherein the isolated resonant converter is one of an isolated half-bridge resonant converter and an isolated full-bridge resonant converter, the switch set of the isolated half-bridge resonant converter is a half-bridge switch set, and the switch set of the isolated full-bridge resonant converter is a full-bridge switch set.

7. The method according to claim 6, wherein the isolated resonant converter further includes a knee point voltage detection circuit and a microcontroller, the knee point voltage detection circuit includes a current limit resistor, a negative voltage clamping diode having a second anode and a second cathode, an RC delay circuit and a comparator having a positive input terminal, a negative input terminal and a second signal output terminal, the RC delay circuit includes a delay resistor and a delay capacitor, the current limit resistor is electrically connected between the first signal output terminal and the negative input terminal, the second cathode is electrically connected to the negative input terminal, the second anode is electrically connected to the ground, the delay resistor is electrically connected between the second cathode and the positive input terminal, the delay capacitor is electrically connected to the positive input terminal and the ground, the second signal output terminal is electrically connected to the microcontroller, a first output signal of the first signal output terminal is delayed to be transmitted to the positive input terminal via the RC delay circuit, when a voltage difference between the positive input terminal and the negative input terminal of the comparator is larger than a hysteresis voltage of the comparator, a second output signal of the comparator is a high potential, the second output signal is used as a trigger source for the microcontroller to capture a voltage feedback signal of the isolated resonant converter, and the voltage holder maintains the output voltage vaux_dh(t) at a predetermined level until the auxiliary switch is turned on such that the microcontroller has enough time to get a voltage value of the auxiliary winding when a secondary current of the isolated resonant converter is zero.

8. The method according to claim 7, wherein the microcontroller receives the output voltage of the voltage holder and the second output signal to estimate the voltage value of the auxiliary winding when the secondary current of the isolated resonant converter is zero, and then to estimate the output voltage Vo of the isolated resonant converter.

9. The method according to claim 7, wherein the isolated resonant converter further includes an AC power source, a filter circuit and a bridge rectifier, the filter circuit is electrically connected to the AC power source in parallel, the bridge rectifier is electrically connected to the filter circuit in parallel, the DC power source is electrically connected to the bridge rectifier in parallel, the DC power source is an input capacitor having a first terminal and a second terminal, the half-bridge switch set includes a first switch and a second switch, each of which has a first terminal, a second terminal and a control terminal, the first terminal of the first switch is electrically connected to the first terminal of the input capacitor, the second terminal of the first switch is electrically connected to the first terminal of the second switch and the resonant capacitor, the second terminal of the second switch is electrically connected to the second terminal of the input capacitor and the ground, the control terminals of the first and the second switches are electrically connected to the microcontroller, the full-bridge switch set includes a third switch, a fourth switch, a fifth switch and a sixth switch, each of which has a first terminal, a second terminal and a control terminal, the first terminal of the third switch is electrically connected to the first terminal of the input capacitor, the second terminal of the third switch is electrically connected to the first terminal of the fourth switch and the current sampling resistor, the second terminal of the fourth switch is electrically connected to the second terminal of the input capacitor and the ground, the first terminal of the fifth switch is electrically connected to the first terminal of the input capacitor, the second terminal of the fifth switch is electrically connected to the resonant capacitor and the first terminal of the sixth switch, the second terminal of the sixth switch is electrically connected to the ground, and the control terminals of the third switch to the sixth switch are electrically connected to the microcontroller.

10. The method according to claim 5, wherein the isolated resonant converter further includes a second output diode and an output capacitor, the secondary winding has a first terminal, a second terminal and a central tap, each of the first and the second output diodes has an anode and a cathode, the anode of the first output diode is electrically connected to the first terminal of the secondary winding, the cathode of the first output diode is electrically connected to the cathode of the second output diode, the anode of the second output diode is electrically connected to the second terminal of the secondary winding, the output capacitor is electrically connected to the cathode of the first output diode and the central tap, the output resistor is electrically connected to the output capacitor in parallel, the central tap is electrically connected to a ground, and a cross voltage of the output resistor is the output voltage Vo of the isolated resonant converter.

* * * * *